United States Patent
Wani et al.

(10) Patent No.: US 12,216,887 B2
(45) Date of Patent: Feb. 4, 2025

(54) CONTEXT PRESERVING FILTERS

(71) Applicant: Baker Hughes Holdings LLC, Houston, TX (US)

(72) Inventors: Rohit Wani, Aurangabad (IN); Saudamini Ingale, Thane West (IN); Pinal Bhuta, Thane West (IN); Ozge C. Whiting, Pawtucket, MA (US); Karan Sonawane, Thane (IN)

(73) Assignee: Baker Hughes Holdings LLC, Houston, TX (US)

( * ) Notice: Subject to any disclaimer, the term of this patent is extended or adjusted under 35 U.S.C. 154(b) by 522 days.

(21) Appl. No.: 17/553,116

(22) Filed: Dec. 16, 2021

(65) Prior Publication Data

US 2023/0195284 A1 Jun. 22, 2023

(51) Int. Cl.
*G06F 3/0484* (2022.01)
*G06F 3/0483* (2013.01)

(52) U.S. Cl.
CPC .......... *G06F 3/0484* (2013.01); *G06F 3/0483* (2013.01)

(58) Field of Classification Search
CPC .............................. G06F 3/0484; G06F 3/0483
See application file for complete search history.

(56) References Cited

U.S. PATENT DOCUMENTS

| | | | |
|---|---|---|---|
| 9,275,121 B2* | 3/2016 | Ah-Soon | G06F 16/256 |
| 2017/0160733 A1* | 6/2017 | Oostendorp | G05B 19/41875 |
| 2018/0307747 A1* | 10/2018 | Du | G06F 40/284 |
| 2019/0121915 A1* | 4/2019 | Torrenti | G06F 16/9535 |

* cited by examiner

*Primary Examiner* — Daniel Samwel
(74) *Attorney, Agent, or Firm* — Baker Hughes Company (57) ABSTRACT

A method of preserving context filter criteria includes receiving data characterizing selection of a first application of a plurality of applications associated with an industrial via a first tab of a web browser that includes a graphical user interface (GUI). The industrial enterprise includes a plurality of industrial assets. The method further includes generating a first context dataset associated with the first application based on a second context dataset associated with a second application. The first context dataset includes a first set of filter criteria. The second context dataset is selected based on a first tab identifier indicative of the first tab of the GUI. The method also includes providing the first context dataset to the first application. The method further includes providing a first operation summary in the graphical user interface of the first tab of the web browser. The first operation summary includes search results generated based on the first context dataset.

20 Claims, 6 Drawing Sheets

Reports

| | | Entity(s) Level 1 (3), Level 2 (9) ⊗ | Date(s) 2020-10-01 - 2021-12-07 ⊗ ▽ | More Filters 12 Selected ⊗ | | |
|---|---|---|---|---|---|---|
| × | | 322 | 324 | 326 | 304 | |
| ⊞ Home 310 | | | | | | |
| △ Alerts 312 | | NUMBER | REPORT TYPE | DATE OF INSPECTION (GMT+00) | DATE CREATED (GMT+00)↓ | 306 |
| ◇ Findings 314 | | | 3 Selected ▸ | | | |
| ▯ Reports 316 | ☐ | ANDRETTI-M109-BATTERY_FME-QOA-OGI_20201118 | FME Detailed Survey Inspection | 2020-11-18 17:02 | 2020-11-18 03:29 | |
| ⛬ Devices 318 | ☐ | PHELPS-M23GM-BATTERY_FME-OGI_20201118 | FME Large Area Survey | 2020-11-18 22:29 | 2020-5-18 03:10 | |
| ▦ Entities 320 | ☐ | NICKLAUS-J18C-BATTERY_FME-QOA-OGI_20201118 | FME Detailed Survey Inspection | 2020-11-18 16:23 | 2020-05-09 02:45 | |
| | ☐ | OOOOA_162052811863 | | | 2020-05-09 02:41 | |
| | ☐ | OOOOA_16203686364 | | 2020-11-18 16:23 | 2020-05-07 11:27 | |
| | ☐ | ALI-M3HWT-BATTERY_FME-QOA-OGI_20201118 | FME Detailed Survey Inspection | 2020-11-18 17:28 | 2020-05-07:28 | |
| | ☐ | PELE-3WC-BATTERY_FME-QOA-OGI_20201118 | FME Detailed Survey Inspection | 2020-11-18 20:10 | 2020-03-30 20:40 | |
| | ☐ | OOOOA_161609752385 | FME Detailed Survey Inspection | 2020-11-18 00:00 | 2020-03-18 20:35 | |

| Home 310 | Alerts |
|---|---|
| Alerts 312 | Entity(s): Level 1 (3), Level 2 (9) ⊗    322 ▾    Date(s): 2020-10-01 - 2021-12-07 ⊗    324 ▾    More Filters: 11 Selected ⊗    326 ▾    304    306 |
| Findings 314 | |
| Reports 316 | |
| Devices 318 | |
| Entities 320 | |

304 / 306 filter panel:

| ALERT SEVERITY | ALERT TYPE | ALERT STATUS |
|---|---|---|
| ☑ High | ☑ Emission | 3 Selected ▸ |
| ☑ Medium | ☑ LOPC Liquid | |
| ☑ Low | ☑ Other | |
| INSPECTION TYPE | EQUIPMENT REPAIR STATUS | |
| ☑ OOOOa | ☑ Unscheduled | |
| ☐ LAS | ☑ Reviewed | |
| | ☑ Scheduled | |
| | ☑ Completed | |
| 328 | CLEAR ALL | |

| | SEVERITY | ID | ENTITY | | ALERT STATUS |
|---|---|---|---|---|---|
| ☐ | △ | Search | Search | | |
| ☐ | △ | NOT-C85ABED614B54D | ROAD-RUNNER-SWD-FACILIT | | OPEN |
| ☐ | △ | NOT-612DD6FCC7B44E | ROAD-RUNNER-SWD-FACILIT | | OPEN |
| ☐ | △ | NOT-B8A09ED61F4B4C | UNIVERSITY-20-PW_TG-UNIT | | OPEN |
| ☐ | △ | NOT-525AE989C91A46 | ROAD-RUNNER-SWD-FACILIT | | OPEN |
| ☐ | △ | NOT-93807F5DCB0248 | ROAD-RUNNER-SWD-FACILIT | | DISMISSED |
| ☐ | △ | NOT-052B423F031246 | UNIVERSITY-20-PW_TG-UNIT | | DISMISSED |
| ☐ | △ | NOT-FE5E813557FF4F | ROAD-RUNNER-SWD-FACILIT | | OPEN |
| ☐ | △ | NOT-574BF1456B294C | ROAD-RUNNER-SWD-FACILITY-40K | storage_tank_13 | OPEN |
| ☐ | △ | NOT-CEBBFEC149DC4D | ROAD-RUNNER-SWD-FACILITY-40K | storage_tank_10 | OPEN |

CONTEXT PRESERVING FILTERS

BACKGROUND

An industrial site (e.g., oil field) can include multiple industrial machines (e.g., machines suitable for oil extraction from an oil reservoir). Industrial machines at an oil field can include, for example, oil pumps (e.g., Electrical Submersible Pump (ESP), Surface Pumping Systems (SPS), motors, etc. Industrial machines can be a complex system with multiple operational parameters (e.g., pump speed, pump temperature, and the like). In some implementations, multiple industrial machines can be monitored by a monitoring system. The monitoring system can receive information related to the operational parameters of the industrial machines through one or more sensors configured to detect the operational parameters. The monitoring system may also alter the operational parameters of and industrial machine, for example, by sending a control signal to the industrial machine. The monitoring system, which can be remotely located, can include a graphical user interface (GUI) that can provide the user with information associated with the industrial machine(s) and allow a user to control the operation of the industrial machine(s).

SUMMARY

In one aspect, a method includes receiving data characterizing selection of a first application of a plurality of applications associated with an industrial via a first tab of a web browser that includes a graphical user interface (GUI). The industrial enterprise includes a plurality of industrial assets. The method further includes generating a first context dataset associated with the first application based on a second context dataset associated with a second application. The first context dataset includes a first set of filter criteria. The second context dataset is selected based on a first tab identifier indicative of the first tab of the GUI. The method also includes providing the first context dataset to the first application. The method further includes providing a first operation summary in the graphical user interface of the first tab of the web browser. The first operation summary includes search results generated based on the first context dataset.

One or more of the following features can be included in any feasible combination.

In some implementations, the method further includes rendering the GUI in the first tab of the web browser. The GUI includes a first region and a second region. The first region includes a first plurality of interactive objects representative of a plurality of applications, and the second region including a second plurality of interactive objects representative of filter criteria for selection of information associated with industrial machines in the industrial enterprise. In some implementations, the method further includes selecting the first application based on a first user interaction indicative of selection of a first interactive object of the first plurality of interactive objects in the first region of the graphical user interface (GUI).

In some implementations, the method further includes generating the second context dataset associated with the second application. The generating includes selecting the second application based on a second user interaction indicative of selection of a second interactive object of the plurality of interactive objects in the first region of the graphical user interface (GUI). The generating also includes selecting a second set of filter criteria based on a third user interaction with the second region of the graphical user interface (GUI). The generating further includes generating the second context dataset associated with the second application, wherein the second context dataset includes the second set of filter criteria and the first tab identifier.

In some implementations, generating the first context dataset includes transferring the second set of filter criteria from the second context dataset to the first context dataset. The first set of filter criteria includes the second set of filter criteria. In some implementations, the method further includes storing the second context dataset in a database. In some implementations, the method further includes generating a first query format based on the first context dataset; and retrieving information associated with the first operation summary from an enterprise database, the retrieving based on the first query format.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

An industrial enterprise can include multiple industrial machines (e.g., oil and gas industrial machines) that can be distributed over multiple industrial sites distributed over various geographical locations (e.g., across the globe). A monitoring system can monitor the operations of the industrial machines in the industrial enterprise. For example, the monitoring system can determine whether an industrial machine is operating as desired (e.g., based on detection of operating parameters of the machine). The monitoring system can include a graphical user interface (GUI) that can allow a user to interact with the monitoring system. For example, the user can view alerts (e.g., alarm events) that have been activated in the industrial enterprise, can review existing reports on the industrial machines generated by different users, etc. In some implementations, one or more monitoring system GUIs can be presented via a web browser. For example, the web browser can include multiple tabs and each tab can include a monitoring system GUI.

A monitoring system GUI can allow a user to interact with multiple applications that can be executed by the monitoring system. Each application and can provide a particular type of information associated with the industrial machines in the industrial enterprise (or a subset thereof). For example, an alert application can present the various alarm events of the industrial machines, a report application can present the various reports associated with the different industrial machines (e.g., generated by other users), etc. The applications can be represented by interactive graphical objects in the monitoring system GUI. A user can select an application by interacting with the graphical object (e.g., by the clicking on it).

The user can provide monitoring system GUI with one or more filter criteria based on which information associated with the plurality of industrial machines in the industrial enterprise (e.g., information that fulfils the filter criteria provided by the user via the GUI). In some implementations, the application selected in the GUI application is applied to the subset of industrial machines based on the selected filter criteria. In existing implementations of the web-browser-based monitoring system GUIs, when the user navigates through the various applications, the filter criteria is not preserved. In other words, when the user decides to select an application after working on a previous application, the filter criteria associated with the latter (e.g., which may be entered by the user) may not be applied to the former. This may not be desirable as the user may have to provide the filter criteria all over again. This may be undesirable and inefficient (e.g., when the user wants to use the same filter criteria for multiple applications).

In some implementations of the current subject matter described herein, a technical solution to the technical problem associated with the lack of persistence of the filter criteria for multiple applications is provided. For example, the filter criteria can be preserved and applied to multiple applications for a GUI in a given tab of the web-browser. The user may also generate a new filter criteria (e.g., by adding a new filter criterion to the preserved filter criteria, edit the fields of the preserved filter criteria, etc.) when using a new application in the web-browser-based monitoring system GUI. In some implementations, the user may store the new filter criteria that can be used for a different application. This can increase the efficiency of user interaction with the web-browser-based monitoring system GUI (e.g., reduce the time taken to switch between applications when same or similar filter criteria are used).

Figure 1:
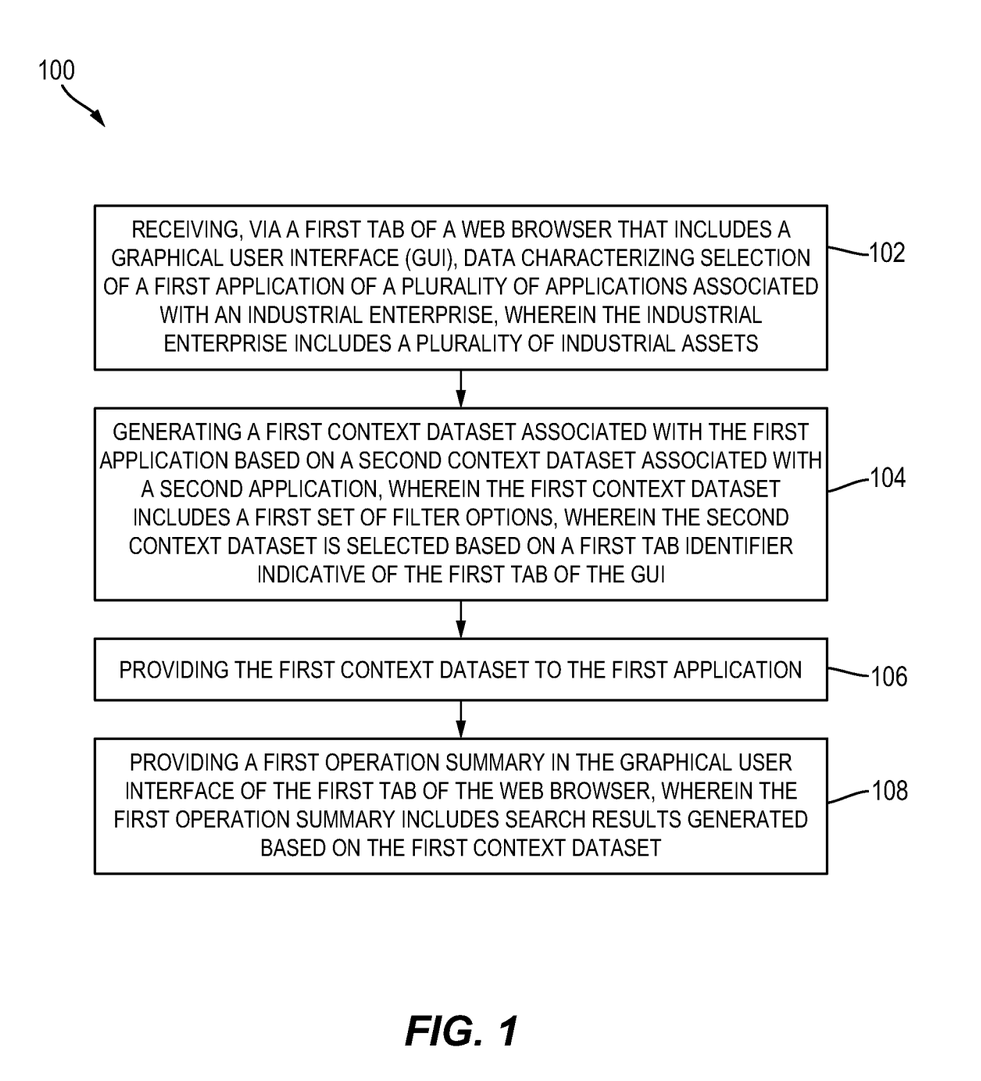
FIG. 1 is a flow chart of an exemplary method for preserving filter criteria in multiple searches of industrial machines performed via a web-browser-based monitoring system GUI.
Figure 2:
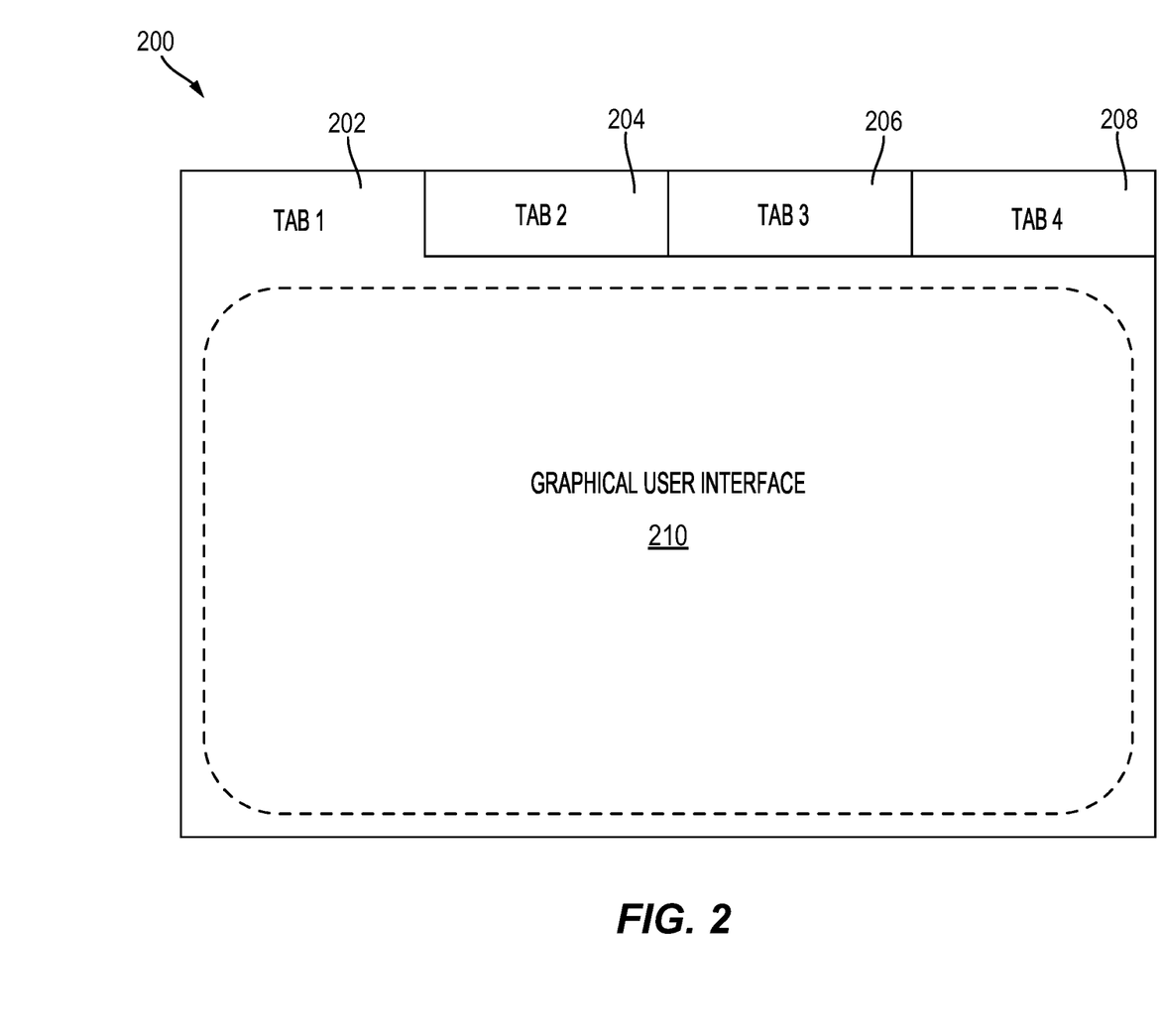
FIG. 2 illustrates an exemplary web-browser of a monitoring system of an industrial enterprise.

FIG. 1 is a flow chart of an exemplary method for executing an application based on preserved filter criteria. At step 102, data characterizing selection of a first application of a plurality of applications associated with an industrial enterprise can be received (e.g., via a first tab of a web browser that includes a graphical user interface (GUI)). The industrial enterprise can include a plurality of industrial assets. FIG. 2 illustrates and exemplary web-browser 200 of a monitoring system of an industrial enterprise. The web-browser can include multiple tabs 202-208. A tab of the web-browser can include a web-browser based GUI that can allow the user to interact with the monitoring system (e.g., via different applications). For example, the first tab 202 can include a web-browser based GUI 210.

Figure 3:
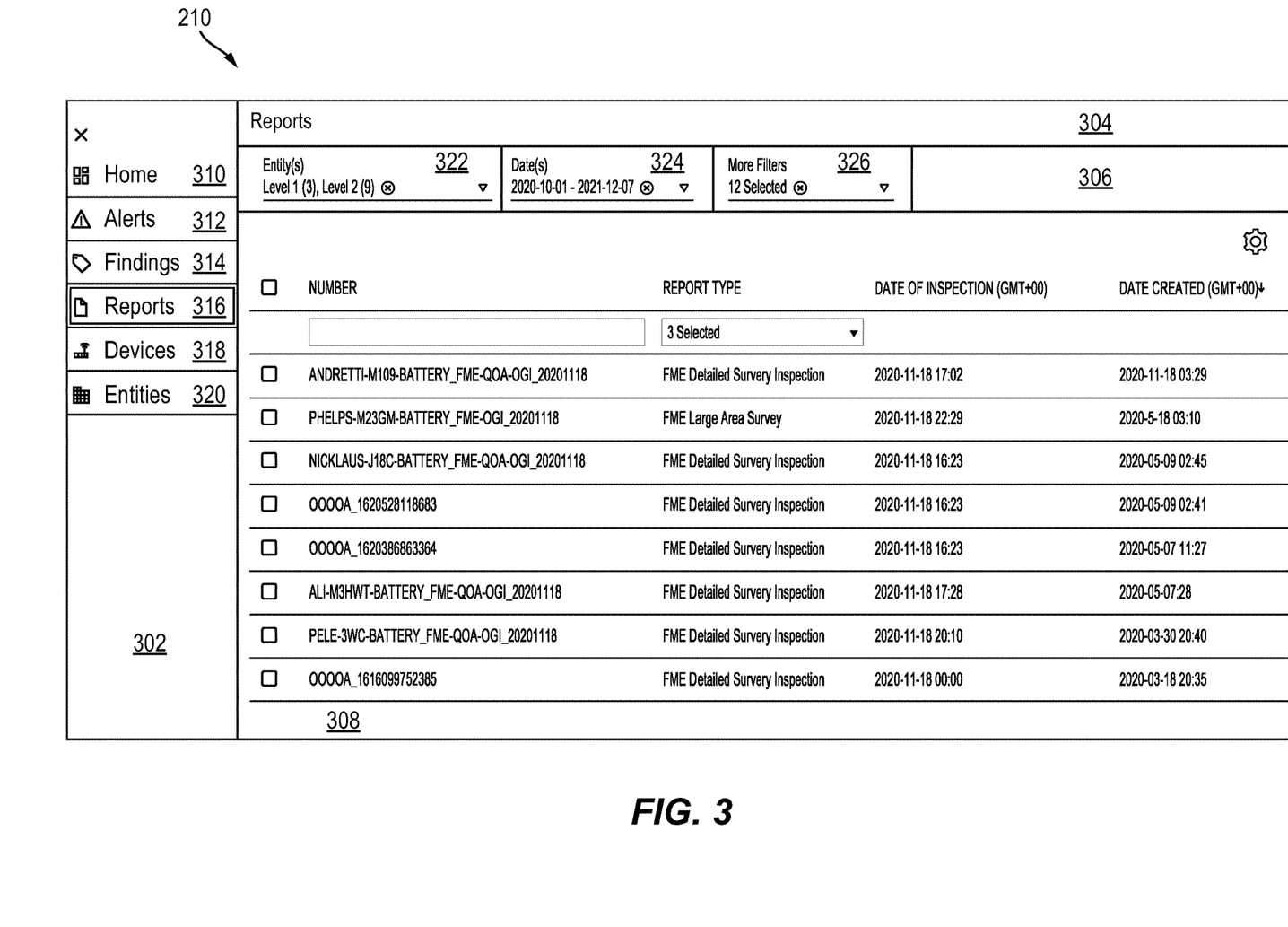
FIG. 3 illustrates an exemplary GUI in the web-browser of FIG. 2.

FIG. 3 illustrates the web-browser based GUI 210. The GUI 210 includes a first region 302 and a second region 304. The first region 302 includes a plurality of interactive objects 310-320. Each interactive object is representative of an application of the monitoring system. An application can be used to interact with the monitoring system of the industrial enterprise (e.g., to retrieve information associated with industrial machines, monitor/control the operation of industrial machine(s), perform operations (e.g., respond to alarm events) on the industrial machine(s), etc.). For example, the first interactive object 310 is representative of the home application; the second interactive graphical object 312 is representative of the alert application (e.g., associated with the alarms generated in the industrial enterprise); the third interactive graphical object 314 is representative of the findings application; the fourth interactive graphical object 316 is representative of the reports application; the fifth interactive graphical object 318 is representative of the entities application; and the sixth interactive graphical object 320 is representative of the work orders application.

The second region 304 can include a first portion 306 that includes a plurality of interactive objects representative of filter criteria for information associated with the industrial machines in the industrial enterprise. The interactive objects representative of filter criteria can include, for example, a level graphical object 322, a date range graphical object 324, etc. In some implementations, the industrial machines in the industrial enterprise can be arranged in levels of a hierarchical structure. Each level of the hierarchical structure can include one or more industrial machines. The level graphical object 322 can allow for selection of industrial machines associated with one or more layers (e.g., first layer, second layer, or both). The date range graphical object 324 can allow for selection of information associated with industrial machines based on a time stamp associated with the information (e.g., based on the time an alarm event or a report was generated). For example, information having a time stamp temporally located in the date range can be selected.

A user can select an application based on interaction with the corresponding graphical object. For example, as illustrated in FIG. 3, a user can select the fourth graphical object 316 (representative of the reports application) based on a first user interaction with the first interactive graphical object 316. The user can select filter criteria based on interaction with level graphical object 322, date range graphical object 324, and graphical object 326. In some implementations, as described below, the user can apply a previously used filter criteria (e.g., associated with a different application) to the interaction with the current application (e.g., report application). Based on the selection of the filters in the first portion 306 of the second region 304, the search results can be displayed in the second portion 308 of the second region 304.

Figure 4:
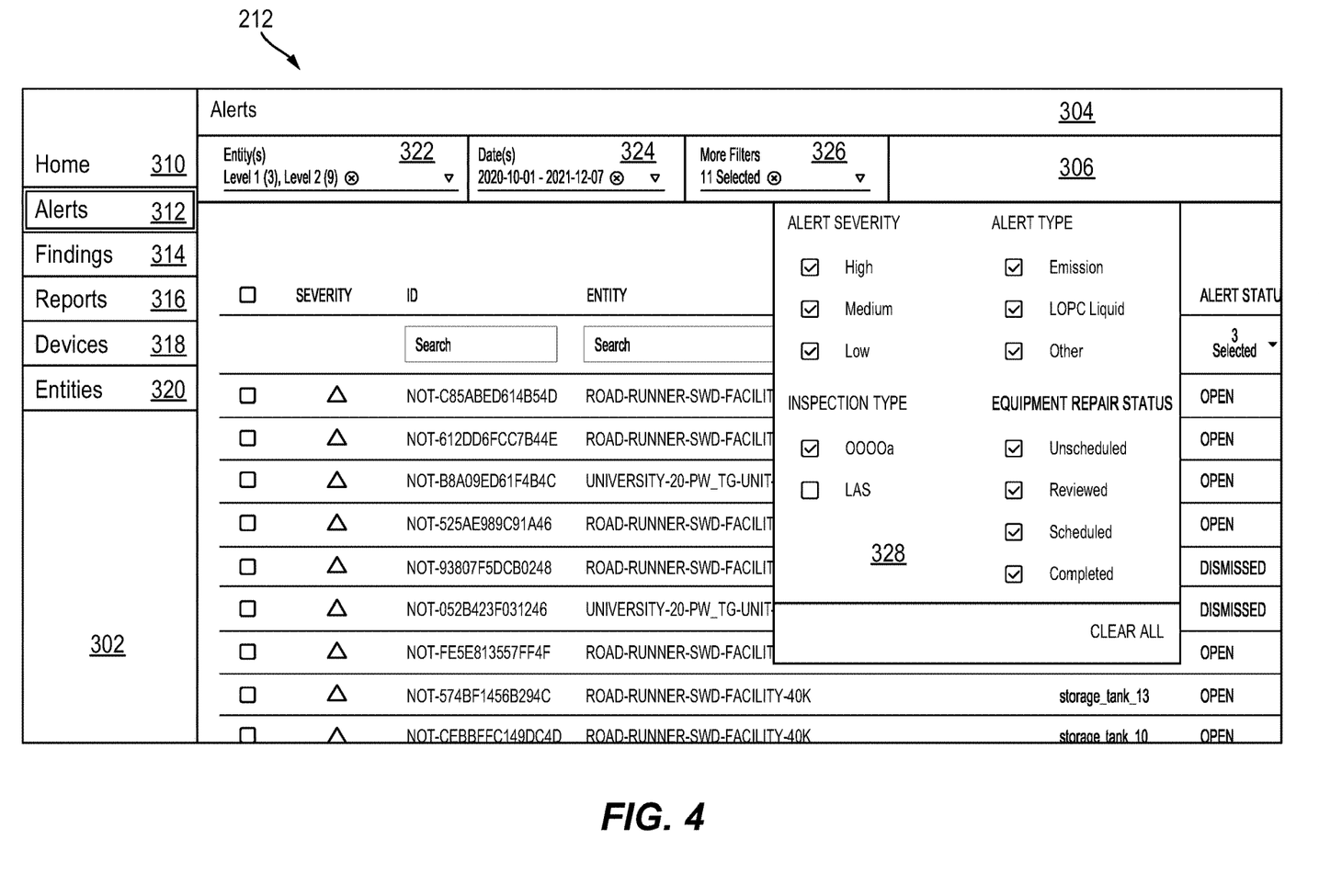
FIG. 4 illustrates another implementation of the GUI in FIG. 3.

FIG. 4 illustrates another implementation of the GUI 210 in which the second graphical object 312 (associated with alert application) and filter criteria associated with the levels of the industrial machine and date range are selected (e.g., via the level graphical object 322 and date range graphical object 324, respectively). Additional filter criteria can be selected from a drop-down menu 328 generated by interacting with the graphical object 326. For example, the drop down box 328 can include additional filter criteria associated with alert severity, alert type, inspection type, equipment repair status.

Returning to FIG. 1, at step 104, a first context dataset associated with the first application can be generated. The generation of the first context dataset can be based on a second context dataset associated with a second application (e.g., a previously used application). The second context dataset associated with a second application (e.g., reports application) can be generated prior to the generation of the first context dataset (e.g. associated with the alert application). In some implementations, the second application can be selected based on a second user interaction indicative of selection of a second interactive object (e.g., fourth graphical object 316 representative of the reports application) in the first region 302 of the GUI 210. Additionally, filter criteria associated with the second application can be selected based on a third user interaction with graphical objects in the first portion 306 of the second region 304. For example, as discussed above for FIG. 3, filter criteria for the reports application can be selected on interaction with level graphical object 322, date range graphical object 324, and graphical object 326. The second context dataset can be generated and the selected filter criteria associated with the second application can be included in the second context dataset.

The second context dataset can be stored (e.g., in memory) and may be retrieved by the first application (e.g., when the user begins working on the first application (alerts application) after working on the second application (e.g., reports application)). The first context dataset of the first application can be generated based on the retrieved second context dataset. For example, the set of filter criteria included in the second context dataset can be included in the set of filter criteria included in the first context dataset. In some implementations, a context dataset (e.g., the first context dataset, the second context dataset, etc.) can include an identifier indicative of the tab (e.g., tab 202, tab 204, tab 206, etc.) of the web-browser 200 in that supports the GUI associated with the first and second applications. For example, the first context data set and second context data set associated with the reports application and alert application, respectively, can include an identifier for the tab 202 that includes the web-browser based GUI 210.

In some implementations, when the user begins working with the first application (e.g., alerts application), the graphical objects in the first portion 306 of the second region 304 can be automatically populated based on the filter criteria used in the previously used second application (e.g., reports application). For example, the level graphical object 322 in FIG. 4 is populated with entries to the level graphical object 322 in FIG. 3 and the date range graphical object 324 in FIG. 4 is populated with entries to the level graphical object 324 in FIG. 3 (associated with reports application).

In some implementations, the first context dataset can be modified based on user interaction with the graphical objects in the first portion 306 of the second region 304 in FIG. 4. For example, the user can change the entries of the level graphical object 322, date range graphical object 324, etc., in FIG. 4 (e.g., which can be populated based on the first context dataset that includes filter criteria in the second context dataset). Based on the change to the entries, the first context dataset can be modified. In some implementations, when the user interacts with a third application (e.g., after interaction with the first application), a third context dataset can be generated that includes filter criteria of the first context dataset.

At step 106, the first context dataset can be provided to the first application. At step 108, a first operation summary can be provided in the graphical user interface of the first tab of the web browser (e.g., GUI 210 of tab 202 of the web browser 200). In some implementations, the first application can receive the first context dataset and generate a query format. Based on the query format a search can be performed on an industrial enterprise database, and information that satisfy the filter criteria in the first context dataset can be retrieved. For example, if the level filter criterion (associated with level graphical object 322) is set to level 1 and level 2 (e.g., as illustrated in FIG. 3), a search result that includes information from the enterprise database associated with industrial machines in level 1 or level 2 of the industrial enterprise hierarchy can be retrieved. If additional filter criteria are provided (e.g., a date range associated with the information is provided via the date range graphical object 324), the search result can be further modified to satisfy the additional filter criteria.

The first operation summary can be provided in the second region 304 of the GUI 210. As illustrated in FIG. 3, the operation summary associated with the alert application is provided in the second portion 308 of the second region 304. The operation summary includes the identity of the selected report(s), the report type, the date of inspection associated with the report(s), and the corresponding date of creation of the report. Alternately, as illustrated in FIG. 4, the operation summary associated with the alert application is provided in the second portion 308 of the second region 304. The operation summary can include the identity of the selected alert event(s) (e.g., alarms), severity of the alert event(s), the industrial machines associated with the alert event(s), alert status, date(s) the alert status was generated, date(s) the alert status was detected, etc.

Figure 5:
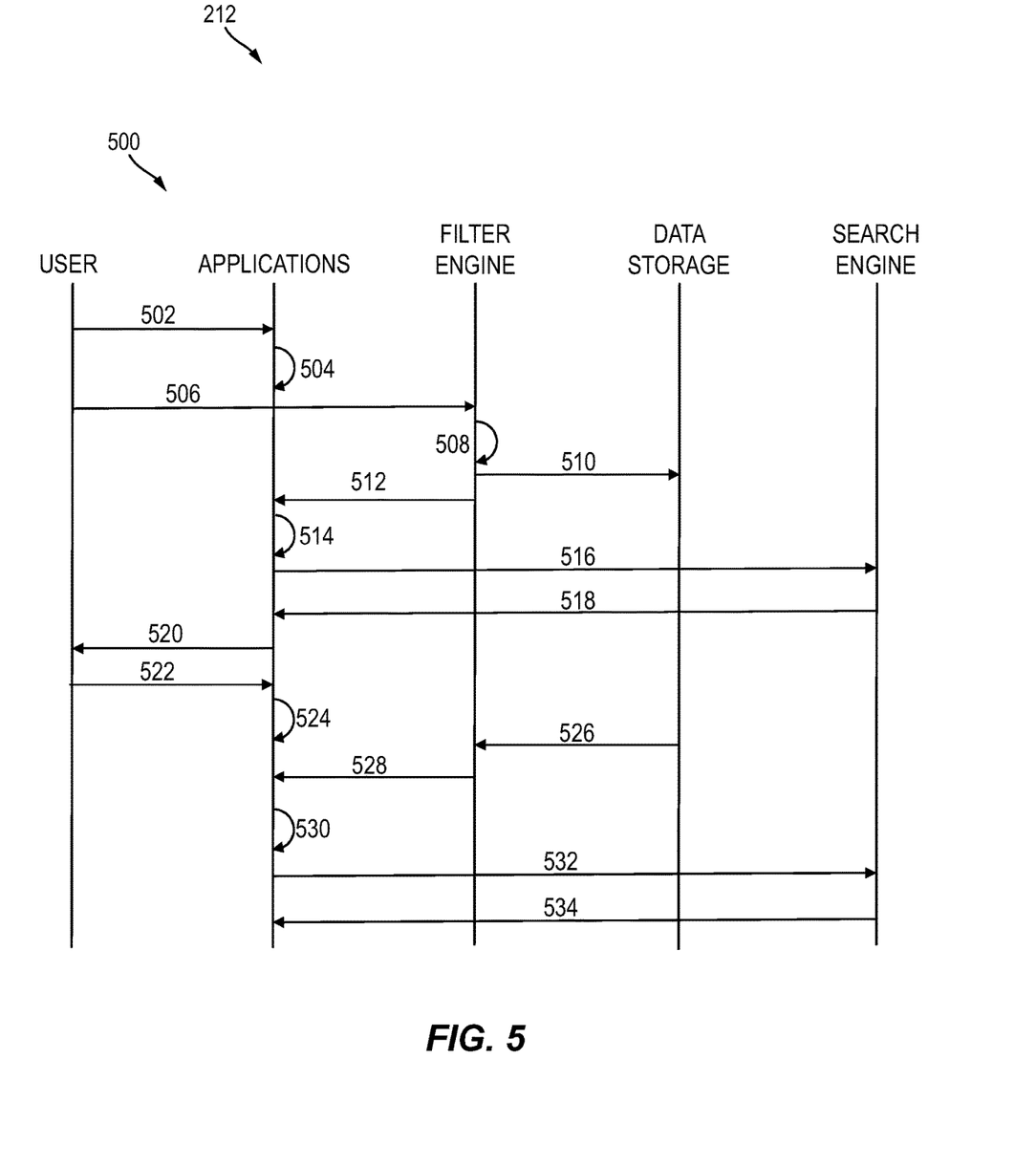
FIG. 5 illustrates an exemplary data flow diagram for preserving filter criteria in a web-browser based GUI.

FIG. 5 illustrates an exemplary data flow diagram of preserving filter criteria in a web-browser based GUI. At 502, a user can select an application (e.g., report application) from a plurality of applications. The selection can be based on interaction with the corresponding graphical object (e.g., fourth interactive graphical object 316) in the graphical user interface (e.g., first region 302 of GUI 210). At 504, the selected application is assigned a tab identifier (e.g., by the report application). The tab identifier can be a unique identifier associated with the tab of the web-browser that includes the GUI with the selected application (e.g., identifier associated with tab 202 that includes the GUI 210). At 506, the user can select the filter criteria (e.g., via interactive graphical objects 322-326 in the first portion 306 of the second region 304 of the GUI) associated with the selected application and provide instructions to the filter engine for generation of a context dataset that can include the selected filter criteria. At 508, the filter engine can add the selected filter criteria to the context dataset, and at 510 the filter engine can store the context dataset in a data storage (e.g., browser data storage). At 512, the filter engine can share the context dataset with the application selected at 502. At 514, the application selected at 502 can parse the context dataset and generate a query format. At 516, the application can provide the query format to the search engine and instruct the search engine to execute the search (e.g., at the industrial enterprise database). At 518, the search engine can provide the search result to the application selected at step 502. At

520, the application can provide the search result to the user (e.g., via the second portion 308 of the second region 304 of the GUI 210).

At 522, the user can select another application (e.g., alert application) from the plurality of applications. The selection can be based on interaction with the corresponding graphical object (e.g., second interactive graphical object 312) in the graphical user interface (e.g., first region 302 of GUI 210). At 524, the selected application is assigned the unique tab identifier (e.g., the alert application can assign the unique tab identifier assigned at 504). At 526, the filter engine can retrieve the context dataset stored in the data storage at 510 and assign the filter criteria of the context dataset to a new context dataset. At 528, the filter engine can share the new context dataset with the application selected at 522. At 530, the application selected at 522 can parse the new context dataset and generate a new query format. At 532, the application can instruct the search engine to execute the search based on the new query format (e.g., at the industrial enterprise database), and at 534, the search engine can provide the search result to the application selected at step 522.

Figure 6:
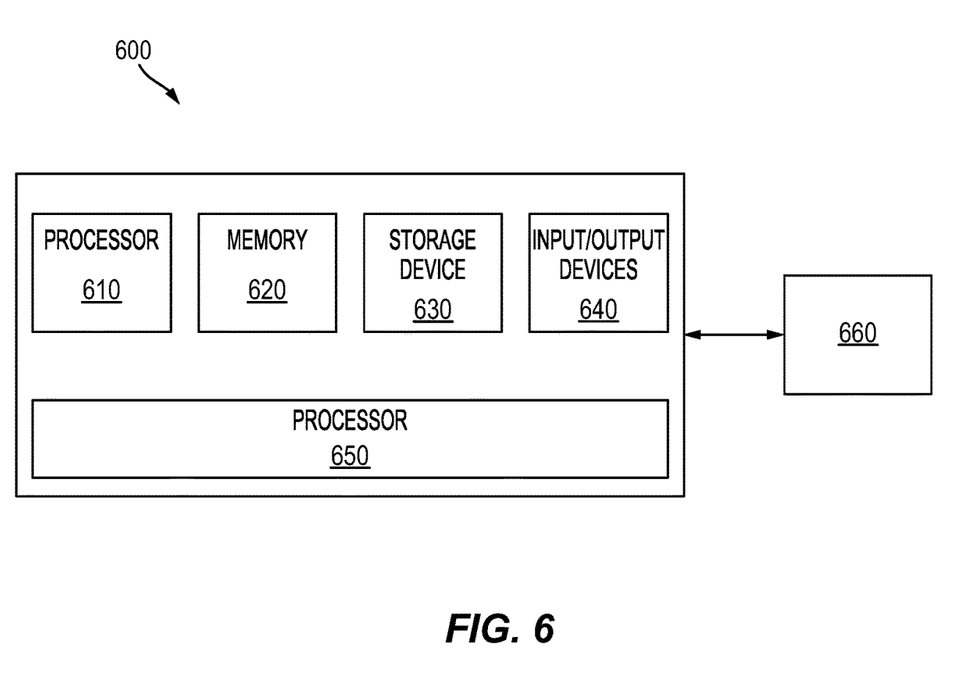
FIG. 6 illustrates an exemplary computing system configured to execute the data flow described in FIG. 5.

FIG. 6 illustrates an exemplary computing system 600 configured to execute the data flow described in FIG. 5. The computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more steps for preserving filter criteria in the web-browser based GUI (e.g., as described in FIG. 1, FIG. 5, etc.). In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640. The processor 610 can support/execute one or more of the applications, filter engine and the search engine described in FIG. 5.

The memory 620 is a computer readable medium such as volatile or non-volatile that stores information within the computing system 600. The memory 620 can store the context datasets. The storage device 630 is capable of providing persistent storage for the computing system 600. The storage device 630 can be a floppy disk device, a hard disk device, an optical disk device, a tape device, a solid state drive, and/or other suitable persistent storage means. The input/output device 640 provides input/output operations for the computing system 600.

In some example embodiments, the input/output device 640 includes a keyboard and/or pointing device. In various implementations, the input/output device 640 includes a display unit for displaying graphical user interfaces. In some implementations, the web-browser 200 of the monitoring system can be displayed in a display of the input/output device 640. In some implementations, the computing device 600 can be communicatively coupled to an industrial enterprise database 660. The search engine (e.g., executed by the processor 610) can perform the search (based on a query format) in the industrial enterprise database 660.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Other embodiments are within the scope and spirit of the disclosed subject matter. For example, the monitoring system described in this application can be used oil fields that can include multiple oil wells. The monitoring system can also be used in facilities that have complex machines with multiple operational parameters that need to be altered to change the performance of the machines (e.g., power generating turbines).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving, via a first tab of a web browser that includes a graphical user interface (GUI), data characterizing selection of a first application of a plurality of applications associated with an industrial enterprise, wherein the industrial enterprise includes a plurality of industrial assets;
   generating a first context dataset associated with the first application based on a second context dataset associated with a second application, wherein the first context dataset includes a first set of filter criteria, wherein the second context dataset is selected based on a first tab identifier indicative of the first tab of the GUI;
   providing the first context dataset to the first application; and
   providing a first operation summary in the graphical user interface of the first tab of the web browser, wherein the first operation summary includes search results generated based on the first context dataset.

2. The method of claim 1, further including rendering the GUI in the first tab of the web browser, the GUI includes a first region and a second region, the first region including a first plurality of interactive objects representative of a plurality of applications, and the second region including a second plurality of interactive objects representative of filter criteria associated with selection of industrial machines in the industrial enterprise.

3. The method of claim 2, further comprising selecting the first application based on a first user interaction indicative of selection of a first interactive object of the first plurality of interactive objects in the first region of the graphical user interface (GUI).

4. The method of claim 2, further comprising generating the second context dataset associated with the second application, the generating including:
   selecting the second application based on a second user interaction indicative of selection of a second interactive object of the plurality of interactive objects in the first region of the graphical user interface (GUI);
   selecting a second set of filter criteria based on a third user interaction with the second region of the graphical user interface (GUI); and
   generating the second context dataset associated with the second application, wherein the second context dataset includes the second set of filter criteria and the first tab identifier.

5. The method of claim 4, wherein generating the first context dataset includes transferring the second set of filter criteria from the second context dataset to the first context dataset, wherein the first set of filter criteria includes the second set of filter criteria.

6. The method of claim 4, further comprising storing the second context dataset in a database.

7. The method of claim 1, further comprising:
   generating a first query format based on the first context dataset; and retrieving information associated with the first operation summary from an enterprise database, the retrieving based on the first query format.

8. A system comprising:

at least one data processor;

memory coupled to the at least one data processor, the memory storing instructions to cause the at least one data processor to perform operations comprising:

receiving, via a first tab of a web browser that includes a graphical user interface (GUI), data characterizing selection of a first application of a plurality of applications associated with an industrial enterprise, wherein the industrial enterprise includes a plurality of industrial assets;

generating a first context dataset associated with the first application based on a second context dataset associated with a second application, wherein the first context dataset includes a first set of filter criteria, wherein the second context dataset is selected based on a first tab identifier indicative of the first tab of the GUI;

providing the first context dataset to the first application; and providing a first operation summary in the graphical user interface of the first tab of the web browser, wherein the first operation summary includes search results generated based on the first context dataset.

9. The system of claim 8, wherein the operations further including rendering the GUI in the first tab of the web browser, the GUI includes a first region and a second region, the first region including a first plurality of interactive objects representative of a plurality of applications, and the second region including a second plurality of interactive objects representative of filter criteria associated with selection of industrial machines in the industrial enterprise.

10. The system of claim 9, wherein the operations further including selecting the first application based on a first user interaction indicative of selection of a first interactive object of the first plurality of interactive objects in the first region of the graphical user interface (GUI).

11. The system of claim 9, wherein the operations further including generating the second context dataset associated with the second application, the generating including:

selecting the second application based on a second user interaction indicative of selection of a second interactive object of the plurality of interactive objects in the first region of the graphical user interface (GUI);

selecting a second set of filter criteria based on a third user interaction with the second region of the graphical user interface (GUI); and generating the second context dataset associated with the second application, wherein the second context dataset includes the second set of filter criteria and the first tab identifier.

12. The system of claim 11, wherein generating the first context dataset includes transferring the second set of filter criteria from the second context dataset to the first context dataset, wherein the first set of filter criteria includes the second set of filter criteria.

13. The system of claim 11, wherein the operations further including storing the second context dataset in a database.

14. The system of claim 8, wherein the operations further including:

generating a first query format based on the first context dataset; and retrieving information associated with the first operation summary from an enterprise database, the retrieving based on the first query format.

15. A computer program product comprising a non-transitory machine-readable medium storing instructions that, when executed by at least one programmable processor that comprises at least one physical core and a plurality of logical cores, cause the at least one programmable processor to perform operations comprising:

receiving, via a first tab of a web browser that includes a graphical user interface (GUI), data characterizing selection of a first application of a plurality of applications associated with an industrial enterprise, wherein the industrial enterprise includes a plurality of industrial assets;

generating a first context dataset associated with the first application based on a second context dataset associated with a second application, wherein the first context dataset includes a first set of filter criteria, wherein the second context dataset is selected based on a first tab identifier indicative of the first tab of the GUI;

providing the first context dataset to the first application; and providing a first operation summary in the graphical user interface of the first tab of the web browser, wherein the first operation summary includes search results generated based on the first context dataset.

16. The computer program product of claim 15, wherein the operations further including rendering the GUI in the first tab of the web browser, the GUI includes a first region and a second region, the first region including a first plurality of interactive objects representative of a plurality of applications, and the second region including a second plurality of interactive objects representative of filter criteria associated with selection of industrial machines in the industrial enterprise.

17. The computer program product of claim 16, wherein the operations further including selecting the first application based on a first user interaction indicative of selection of a first interactive object of the first plurality of interactive objects in the first region of the graphical user interface (GUI).

18. The computer program product of claim 16, wherein the operations further including generating the second context dataset associated with the second application, the generating including:

selecting the second application based on a second user interaction indicative of selection of a second interactive object of the plurality of interactive objects in the first region of the graphical user interface (GUI);

selecting a second set of filter criteria based on a third user interaction with the second region of the graphical user interface (GUI); and generating the second context dataset associated with the second application, wherein the second context dataset includes the second set of filter criteria and the first tab identifier.

19. The computer program product of claim 18, wherein generating the first context dataset includes transferring the second set of filter criteria from the second context dataset to the first context dataset, wherein the first set of filter criteria includes the second set of filter criteria.

20. The computer program product of claim 18, wherein the operations further including storing the second context dataset in a database.

* * * * *